US009600388B2

(12) United States Patent
Takagi

(10) Patent No.: US 9,600,388 B2
(45) Date of Patent: Mar. 21, 2017

(54) INFORMATION PROCESSING APPARATUS THAT COMPUTES POWER CONSUMPTION FOR CPU COMMAND

(71) Applicant: Hitoshi Takagi, Tokyo (JP)

(72) Inventor: Hitoshi Takagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 14/365,877

(22) PCT Filed: Dec. 17, 2012

(86) PCT No.: PCT/JP2012/082615
§ 371 (c)(1),
(2) Date: Jun. 16, 2014

(87) PCT Pub. No.: WO2013/114745
PCT Pub. Date: Aug. 8, 2013

(65) Prior Publication Data
US 2014/0344593 A1    Nov. 20, 2014

(30) Foreign Application Priority Data

Jan. 31, 2012  (JP) ................................. 2012-017989

(51) Int. Cl.
*G06F 1/00*     (2006.01)
*G06F 11/30*    (2006.01)
(Continued)

(52) U.S. Cl.
CPC ........ *G06F 11/3062* (2013.01); *G06F 11/328* (2013.01); *G06F 11/34* (2013.01);
(Continued)

(58) Field of Classification Search
CPC .... G06F 11/3062; G06F 11/328; G06F 11/34; G06F 11/3466; G06F 2201/865; Y02B 60/165
(Continued)

(56) References Cited

U.S. PATENT DOCUMENTS 5,941,991 A  *  8/1999  Kageshima ............. G06F 11/24
                                                       703/20
6,205,555 B1 *  3/2001  Kageshima ............... G06F 1/26
                                                       713/300
(Continued)

FOREIGN PATENT DOCUMENTS

JP           8-44788 A      2/1996
JP           9-218731 A     8/1997
(Continued)

OTHER PUBLICATIONS

"Sa-ba Shoohi Denryoku Sokutei Choosa Kenkyuu ni Kansuru Hookokusho (Report of Investigation Research for Server Power Consumption Measurement)", Japan Electronics & Information Technology Industries Association (JEITA) and Server Business Committee, Jun. 29, 2011 [internet] <URL: http://home.jeita.or.jp/cgi-bin/page/detail.cgi?n=155&ca=1>, [retreived on May 19, 2014], with English Summary. See cited Non-Patent Document 1 on p. 3, paragraph [0007] of the Applicant's Specification for explanation of relevance.
(Continued)

*Primary Examiner* — Aurel Prifti

(57) ABSTRACT

An information processing apparatus includes a hardware processor and a memory storing executable instructions that, when executed by the processor, cause the processor to extract a command from a command cache, complete a process by the command utilizing a predetermined method, input information, which indicates a final result of the process, onto a writing stage when the process by the
(Continued)

command has been completed, compute, when operation of information input onto an execution stage for execution of the process by the command has been completed, power consumption required to execute the command stored in the execution stage in accordance with a status of a CPU (central processing unit) or a status of pertained parts around the CPU, and add, when operation of information input onto the writing stage has been completed, the computed power consumption to a current value of a power accumulating register that is a software visible register, so as to obtain accumulated power consumption.

6 Claims, 1 Drawing Sheet

(51) Int. Cl.
  *G06F 11/34* (2006.01)
  *G06F 11/32* (2006.01)
(52) U.S. Cl.
  CPC .... *G06F 11/3466* (2013.01); *G06F 2201/865* (2013.01); *Y02B 60/165* (2013.01)
(58) Field of Classification Search
  USPC ............... 713/340, 300, 320, 307; 712/208; 717/125
  See application file for complete search history.

(56) References Cited

U.S. PATENT DOCUMENTS

| | | | | |
|---|---|---|---|---|
| 6,757,809 B1* | 6/2004 | Yoshida | ............ | G06F 9/30036 710/307 |
| 8,131,977 B2* | 3/2012 | Yasufuku | ............ | G06F 9/30145 712/208 |
| 2006/0053323 A1* | 3/2006 | Kissell | .................. | G06F 21/81 713/300 |
| 2006/0168485 A1* | 7/2006 | Jusufovic | ............. | G06F 9/3865 714/49 |
| 2009/0164812 A1* | 6/2009 | Capps, Jr. | ............. | G06F 1/3203 713/320 |
| 2010/0138811 A1* | 6/2010 | Jayaraman | ........... | G06F 11/3466 717/125 |
| 2012/0260117 A1* | 10/2012 | Acar | .................... | G06F 1/3243 713/340 |

FOREIGN PATENT DOCUMENTS

| | | |
|---|---|---|
| JP | 10-40144 A | 2/1998 |
| JP | 10-254944 A | 9/1998 |
| JP | 11-161692 A | 6/1999 |
| JP | 2001034499 A | 2/2001 |
| JP | 2002-334128 A | 11/2002 |
| JP | 2005025754 A | 1/2005 |
| JP | 4275282 B2 | 6/2009 |
| JP | 2010191937 A | 9/2010 |

OTHER PUBLICATIONS

International Search Report for PCT Application No. PCT/JP2012/082615, mailed on Feb. 5, 2013.

NOA of JP Application No. 2013-556214 mailed on Mar. 3, 2015 with English Translation.

* cited by examiner

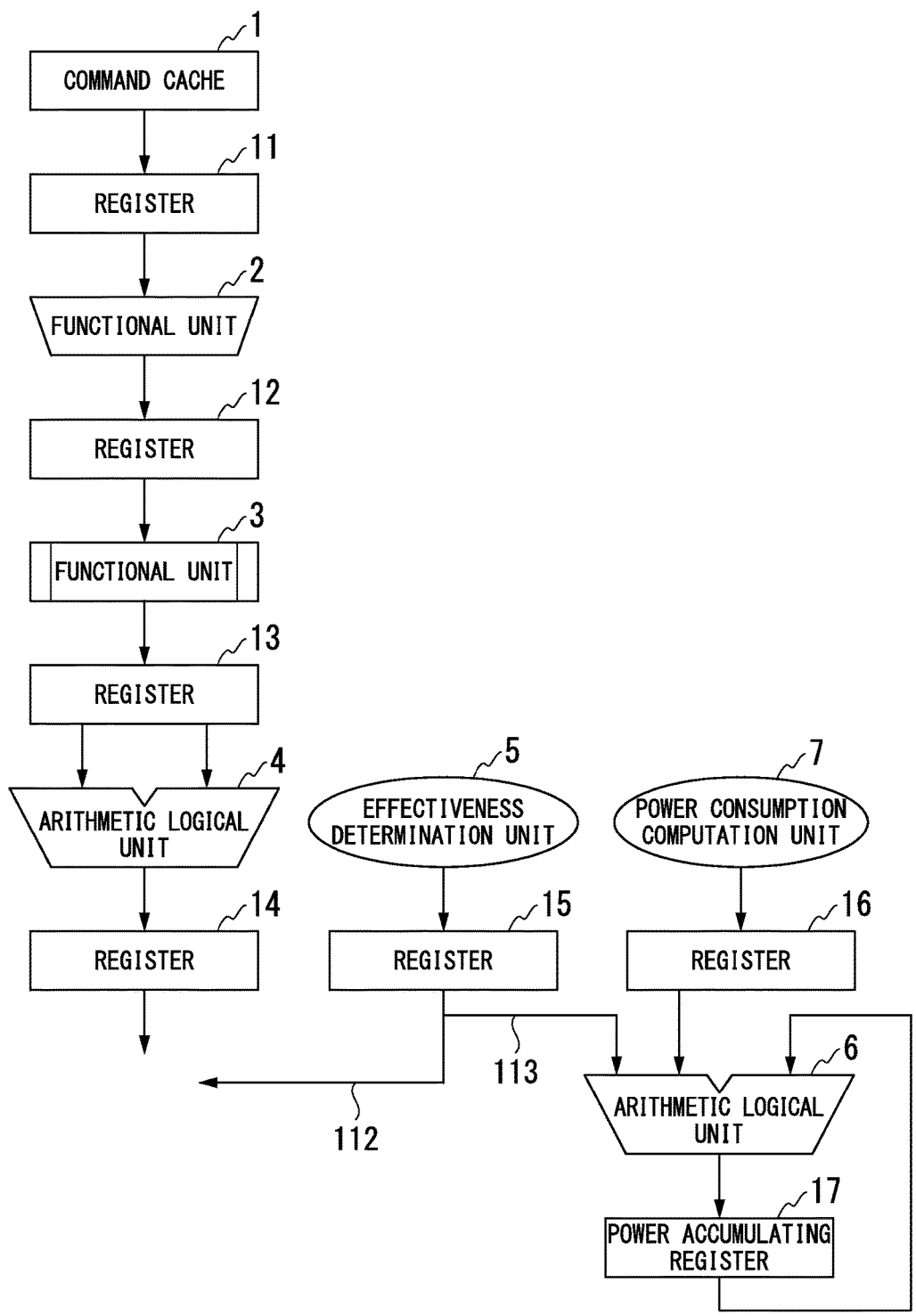

INFORMATION PROCESSING APPARATUS THAT COMPUTES POWER CONSUMPTION FOR CPU COMMAND

CROSS-REFERENCE TO RELATED APPLICATIONS

This application is a National Stage Entry of PCT/JP2012/082615 filed Dec. 17, 2012, which claims priority from Japanese Patent Application 2012-017989 filed Jan. 31, 2012, the contents of all of which are incorporated herein by reference, in their entirety.

BACKGROUND OF THE INVENTION (1) Field of the invention

The present invention relates to an information processing apparatus and an (electric) power consumption computation method for the information processing apparatus.

In particular, when a CPU (Central Processing Unit) command is effectively executed, such an information processing apparatus can estimate power consumption, which is one of system information items, for each work load (i.e., application).

(2) Description of Related Art

Recently, in accordance with increasing concern about global warming and growing consciousness for energy conservation, it is required to accurately compute (electric) power consumed by an ICT (Information and Communication Technology) device.

Conventionally, such power consumed by an ICT device has been computed by estimating it utilizing, for example, rated power of a power supply or by attaching a sensor to a connector of a power supply cord. However, for a logical management unit (e.g., a program or a process) graspable by the user, power management has not been accurately managed. More specifically, total power consumption has been distributed into individual management units while applying a certain assumption to logical management units.

Additionally, in recent information processing systems which employ developed virtualization, it is required to obtain power consumption of each individual virtual machine.

As a known technique of the relevant technical field, Patent Document 1 discloses high-speed estimation of power consumption of a large-scaled semiconductor integrated circuit when designing the semiconductor integrated circuit utilizing a processor core or a megacell core.

More specifically, a device is provided to simulate a process executed by a processor unit and compute power consumed by the processor unit by referring to power consumption information of the processor unit, that is obtained in advance. Another device is also provided to simulate a functional block and compute power consumption based on power consumption information for each individual state of part of input pins or output pins of the functional block at its operation level. Another device is further provided to compute power consumption based on power consumption information for each logic gate and the number of times of toggling in a signal output from the logic gate. Another device is also provided to sum the power consumption values of individual blocks and output the result thereof. The operations by the above devices are repeated until execution of program codes simulated by the relevant processor is completed, and thereby power consumed by the entire circuit is computed.

In addition, Patent Document 2 discloses a logic design apparatus for estimating power consumed by a device.

More specifically, a secondary power supply that supplies power, a circuit that measures power consumption, and a voltmeter/ammeter are provided to electrically rewritable logic devices mounted on an emulator, and an MPU (microprocessor unit) or ICE (in-circuit emulator) function is applied to the logic devices. A software application is performed on the emulator and the voltmeter/ammeter measures power consumption required for executing a predetermined command unit of the performed software application. A power consumption summation unit computes a maximum value, a minimum value, and an average of the measured power consumption. A display unit displays the measured power consumption on a screen of a memory window provided at a source code debugger of an in-circuit emulator. Based on a power consumption conversion table stored in a conversion table storage unit, the power consumption summation unit converts the measured power consumption to power consumed by a target device (final product) such as an LSI.

In addition, Patent Document 3 discloses a method used in a processor that includes an MMU (memory management unit) and a cache memory and converts each logical address to a physical address. In the method, power consumption of a semiconductor integrated circuit of the processor is estimated at a high speed at an architectural level.

More specifically, power consumption information on each MMU operation in the MMU is prepared in advance, and a write back mode and a write through mode are distinguished from each other in a cache unit. In addition, power consumption information on each cache operation (that includes writing of dirty data) is prepared, and power consumption information about each command of the UPU is also utilized. Accordingly, during or after the simulation, power consumed in the entire circuit as the target for the simulation is computed based on the power consumption information.

PRIOR ART DOCUMENT

Patent Document

Patent Document 1: Japanese Unexamined Patent Application, First Publication No. H11-161692.
Patent Document 2: Japanese Patent Publication No. 4275282.
Patent Document 3: Japanese Unexamined Patent Application, First Publication No. 2002-334128.

Non-Patent Document

Non-Patent Document 1: "Sa-ba Shoohi Denryoku Sokutei Choosa Kenkyuu ni kansuru hookokusho" (Report of Investigation Research for Server Power Consumption Measurement), general incorporated association "JEITA" (Japan Electronics & Information Technology Industries Association) and Server Business Committee, Jun. 29, 2011 (URL: http://home.jeita.or.jp/cgi-bin/page/detail.cgi?n=155&ca=1).

Problem to be Solved by the Invention

The above-described information processing apparatuses cannot calculate specific and accurate system information (e.g., power consumption) in an operation environment in which a plurality of work loads are effective.

In a method of obtaining system information such as power consumption for each work load of the CPU, a specific time interval or a specific operating condition is assumed. Then, information (e.g., power), that is obtained by means of an indirect method at the specific time intervals or until the specific condition is satisfied, is divided at a rate (which includes an assumption) so as to acquire the system information. In this case, accurate power for each work load of the CPU cannot by estimated.

More specifically, the rate between a system program (e.g., a command sequence of a typical hardware resource, an application for system establishment, a program of an operation system, and the like) and a user program can be obtained only as an experimental rate so as to be utilized for the relevant division.

The above Patent Documents 1 to 3 each disclose a technique about a power estimation device based on a software or hardware emulation.

More specifically, in the technique disclosed in the above-described Patent Document 1, the power consumption is not simulated but actually consumed power is digitized and stored in a register utilized by commands.

In addition, it is evidently shown that power values are stored as data written in a predetermined table manner.

Additionally, the technique disclosed by Patent Document 2 employs at least the MPU as the target hardware resource and simulates (or emulates) the power of the MPU by means of an FPGA (Field Programmable Gate Array) so as to estimate the power, where actual power required for operation of the MPU itself is not measured.

Similarly, the technique disclosed by Patent Document 3 estimates, not power required for actual operation of the cache memory and the MMU, but power through a simulation utilizing a software resource.

BRIEF SUMMARY OF THE INVENTION

An object of the present invention is to provide an information processing apparatus and a power consumption computation method for the information processing apparatus, which solves the above problem.

Means for Solving the Problem

In order to achieve the above object, an information processing apparatus of the present invention includes:

a device that extracts a command from a command cache;

a device that completes a process by the command utilizing a predetermined method;

a device that inputs information, which indicates a final result of the process, onto a writing stage when the process by the command has been completed;

a device that computes, when operation of information input onto an execution stage for execution of the process by the command has been completed, power consumption required to execute the command stored in the execution stage in accordance with a status of a CPU (central processing unit) or a status of pertained parts around the CPU; and a device that adds, when operation of information input onto the writing stage has been completed, the computed power consumption to a current value of a power accumulating register that is a software visible register (that can be referred to by means of a software resource), so as to obtain accumulated power consumption.

In addition, a power consumption computation method for an information processing apparatus of the present invention includes:

a step that extracts a command from a command cache;

a step that completes a process by the command utilizing a predetermined method;

a step that inputs information, which indicates a final result of the process, onto a writing stage when the process by the command has been completed;

a step that computes, when operation of information input onto an execution stage for execution of the process by the command has been completed, power consumption required to execute the command stored in the execution stage in accordance with a status of a CPU (central processing unit) or a status of pertained parts around the CPU; and a step that adds, when operation of information input onto the writing stage has been completed, the computed power consumption to a current value of a power accumulating register that is a software visible register, so as to obtain accumulated power consumption.

Effect of the Invention

As described above, in accordance with the present invention, it is possible to accurately obtain power consumption, that is one of system information items, for each CPU command.

BRIEF DESCRIPTION OF THE DRAWINGS

FIG. 1 is a diagram showing the entire structure of an information processing apparatus as an embodiment of the present invention.

DETAILED DESCRIPTION OF THE INVENTION

FIG. 1 is a diagram showing the entire structure of an information processing apparatus as an embodiment of the present invention.

The information processing apparatus of the present embodiment has structural elements that form a command pipe line of a CPU, which are a command cache 1, functional units 2 and 3, an arithmetic logical unit 4, an effectiveness determination unit 5, an arithmetic logical unit 6, a power consumption computation unit 7, registers 11 to 16, and a power accumulating register 17.

The register 11 is assigned to a command decoding stage, the register 12 to an operand fetch stage, the register 13 to an execution stage, and the register 14 to a writing stage.

Below, the general function of the information processing apparatus in the present embodiment will be explained.

First, command codes of the CPU are extracted sequentially from the command cache 1. Each command code of the CPU passes through the register 11 (command decoding stage), the functional unit 2, the register 12 (operand fetch stage), the functional unit 3, the register 13 (execution stage), the arithmetic logical unit 4, and the register 14 (writing stage) in this order. This passing operation completes the pipe line operation of the relevant command code in the CPU.

Here, information that indicates a final result of the pipe line operation is input into the register 14 (writing stage). For effectiveness of the information that indicates the final result of the pipe line operation for the command (i.e., the information input into the register 14 (writing stage)), the effectiveness determination unit determines the effectiveness in consideration of various states within the CPU and inputs information, that indicates a result of the determination, into the register 15. Accordingly, information that indicates the effectiveness of the writing at the register 14 (writing stage) is shown as the information input into the register 15.

After that, final signal writing to a software visible (or accessible) register is performed utilizing a signal 112.

When the operation of information input into the register 13 (execution stage) has been completed, the power consumption computation unit 7 computes power consumption required to execute the command code stored in the register 13 (execution stage) in accordance with the status of the CPU or the status of pertained parts (hardware resources) around the CPU.

The pertained parts may include a bridge chip that supports the operation of the CPU, a management chip, a power supply unit, sensors on the mother board, or the like.

When the operation of information input into the register 14 (writing stage) has been completed, The arithmetic logical unit 6 adds the power consumption required to execute the command code stored in the register 13 (execution stage) to the current value at the power accumulating register 17 so as to obtain accumulated power consumption. In this process, the arithmetic logical unit 6 determines effectiveness of the accumulated power consumption based on a signal 113 that indicates the effectiveness about the execution of the relevant command and is received from the register 15. If it is determined that the accumulated power consumption is effective, the arithmetic logical unit 6 inputs the accumulated power consumption into the power accumulating register 17.

The CPU command codes incorporated into software resources may relate to a command utilized to refer to the power accumulating register 17, a command utilized to reset the power accumulating register 17, or a command utilized to copy the content of the power accumulating register 17 to another software visible register. If a user refers to the value of the power accumulating register 17 at appropriate intervals by means of the above-described commands, the user can know the power consumption (one of the system information items) for each logical management unit such as a program, a process, a user, a virtual machine, or the like.

In a virtual machine environment, power consumption by each virtual machine by associating an identifier of the virtual machine with power consumption information on the virtual machine.

In accordance with the information processing apparatus of the present embodiment, power consumption required for each command can be accumulated. Therefore, it is possible to accurately compute the value of power required for a specific program executed on the CPU or each process managed by an OS (operating system) or the like.

In the virtual machine environment, the power consumption computation unit 7 may associate an identifier of the virtual machine, which is assigned to each individual command with power consumption information on this virtual machine, and thereby power consumption of each virtual machine can be computed.

Although all or part of the above-described embodiment can be described as follows, the present invention is not limited to the followings.

Supplement 1

An information processing apparatus comprising:
a device that extracts a command from a command cache;
a device that completes a process by the command utilizing a predetermined method;
a device that inputs information, which indicates a final result of the process, onto a writing stage when the process by the command has been completed;
a device that computes, when information input onto an execution stage for execution of the process by the command has been completed, power consumption required to execute the command stored in the execution stage in accordance with a status of a CPU (central processing unit) or a status of pertained parts around the CPU; and
a device that adds, when information input onto the writing stage has been completed, the computed power consumption to a current value of a power accumulating register that is a software visible register, so as to obtain accumulated power consumption.

Supplement 2

The information processing apparatus described in Supplement 1, further comprising:
a device that:
determines in consideration of an internal state of the CPU, effectiveness of the information that was input onto the writing stage and indicates the final result of the process that is a pipe line process; and
inputs information that indicates a result of the determination into a predetermined internal register.

Supplement 3

The information processing apparatus described in Supplement 2, further comprising:
a device that:
determines effectiveness of the power consumption to be accumulated in the power accumulating register based on the information that indicates said result of the determination and has been input onto the predetermined internal register; and
inputs, if it is determined that the power consumption is effective, the accumulated power consumption into the power accumulating register.

Supplement 4

The information processing apparatus described in any one of Supplements 1 to 3, wherein:
possible types of the command include a command utilized to refer to the power accumulating register, a command utilized to reset the power accumulating register, and a command utilized to copy a content of the power accumulating register to another software visible register.

Supplement 5

The information processing apparatus described in Supplement 1, wherein:
possible types of the pertained parts around the CPU include a bridge chip that supports operation of the CPU, a management chip, a power supply unit, and a sensor on a mother board.

Supplement 6

A power consumption computation method for an information processing apparatus comprising:
a step that extracts a command from a command cache;
a step that completes a process by the command utilizing a predetermined method;

a step that inputs information, which indicates a final result of the process, onto a writing stage when the process by the command has been completed;
a step that computes, when information input onto an execution stage for execution of the process by the command has been completed, power consumption required to execute the command stored in the execution stage in accordance with a status of a CPU (central processing unit) or a status of pertained parts around the CPU; and
a step that adds, when information input onto the writing stage has been completed, the computed power consumption to a current value of a power accumulating register that is a software visible register, so as to obtain accumulated power consumption.

Supplement 7

The power consumption computation method for the information processing apparatus described in Supplement 6, further comprising:
a step that:
determines in consideration of an internal state of the CPU, effectiveness of the information that was input onto the writing stage and indicates the final result of the process that is a pipe line process; and
inputs information that indicates a result of the determination into a predetermined internal register.

Supplement 8

The power consumption computation method for the information processing apparatus described in Supplement 7, further comprising:
a step that:
determines effectiveness of the power consumption to be accumulated in the power accumulating register based on the information that indicates said result of the determination and has been input onto the predetermined internal register; and
inputs, if it is determined that the power consumption is effective, the accumulated power consumption into the power accumulating register.

Supplement 9

The power consumption computation method for the information processing apparatus described in any one of Supplements 6 to 8, wherein:
possible types of the command include a command utilized to refer to the power accumulating register, a command utilized to reset the power accumulating register, and a command utilized to copy a content of the power accumulating register to another software visible register.
Supplement 10
The power consumption computation method for the information processing apparatus described in Supplement 6, wherein:
possible types of the pertained parts around the CPU include a bridge chip that supports operation of the CPU, a management chip, a power supply unit, and a sensor on a mother board.

In accordance with the present invention, it is possible to accurately obtain power consumption, that is one of system information items, for each CPU command.

REFERENCE SYMBOLS 1 command cache
2, 3 functional unit
4, 6 arithmetic logical unit
5 effectiveness determination unit
7 power consumption computation unit
11 to 16 register
17 power accumulating register
112, 113 signal
The invention claimed is:
1. An information processing apparatus comprising:
a hardware processor including:
a logic device that extracts a command from a command cache;
a logic device that completes a process by the command utilizing a predetermined method;
a logic device that inputs information, which indicates a final result of the process, onto a writing stage when the process by the command has been completed;
a logic device that computes, when operation of information input onto an execution stage for execution of the process by the command has been completed, power consumption required to execute the command stored in the execution stage in accordance with a status of a CPU (central processing unit) or a status of pertained parts around the CPU;
a logic device that adds, when operation of information input onto the writing stage has been completed, the computed power consumption to a current value of a power accumulating register that is a software visible register, so as to obtain accumulated power consumption;
a logic device that determines in consideration of an internal state of the CPU, effectiveness of the information that was input onto the writing stage and indicates the final result of the process that is a pipe line process and inputs information that indicates a result of the determination into a predetermined internal register; and
a logic device that determines effectiveness of the power consumption to be accumulated in the power accumulating register based on the information that indicates said result of the determination and has been input onto the predetermined internal register; and inputs, if it is determined that the power consumption is effective, the accumulated power consumption into the power accumulating register.
2. The information processing apparatus in accordance with claim 1, wherein:
possible types of the command include a command utilized to refer to the power accumulating register, a command utilized to reset the power accumulating register, and a command utilized to copy a content of the power accumulating register to another software visible register.
3. The information processing apparatus in accordance with claim 1, wherein:
possible types of the pertained parts around the CPU include a bridge chip that supports operation of the CPU, a management chip, a power supply unit, and a sensor on a mother board.
4. A power consumption computation method for an information processing apparatus, wherein the method comprises:
extracting a command from a command cache;
completing a process by the command utilizing a predetermined method;
inputting information, which indicates a final result of the process, onto a writing stage when the process by the command has been completed;

computing, when operation of information input onto an execution stage for execution of the process by the command has been completed, power consumption required to execute the command stored in the execution stage in accordance with a status of a CPU (central processing unit) or a status of pertained parts around the CPU;

adding, when operation of information input onto the writing stage has been completed, the computed power consumption to a current value of a power accumulating register that is a software visible register, so as to obtain accumulated power consumption;

determining in consideration of an internal state of the CPU, effectiveness of the information that was input onto the writing stage and indicates the final result of the process that is a pipe line process;

inputting information that indicates a result of the determination into a predetermined internal register;

determining effectiveness of the power consumption to be accumulated in the power accumulating register based on the information that indicates said result of the determination and has been input onto the predetermined internal register; and inputting, if it is determined that the power consumption is effective, the accumulated power consumption into the power accumulating register.

5. The power consumption computation method for the information processing apparatus in accordance with claim 4, wherein:

possible types of the command include a command utilized to refer to the power accumulating register, a command utilized to reset the power accumulating register, and a command utilized to copy a content of the power accumulating register to another software visible register.

6. The power consumption computation method for the information processing apparatus in accordance with claim 4, wherein:

possible types of the pertained parts around the CPU include a bridge chip that supports operation of the CPU, a management chip, a power supply unit, and a sensor on a mother board.

* * * * *